(12) United States Patent
Eichendorf et al.

(10) Patent No.: US 10,670,308 B2
(45) Date of Patent: Jun. 2, 2020

(54) ADSORPTION REFRIGERATION DEVICE, ARRANGEMENT AND MOTOR VEHICLE

(71) Applicant: Robert Bosch GmbH, Stuttgart (DE)

(72) Inventors: Andreas Eichendorf, Stuttgart (DE); Thomas Demmer, Stuttgart (DE); Ulrich Kappenstein, Knittlingen (DE); Ralf Diekmann, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 512 days.

(21) Appl. No.: 15/105,095

(22) PCT Filed: Nov. 5, 2014

(86) PCT No.: PCT/EP2014/073839
§ 371 (c)(1),
(2) Date: Jun. 16, 2016

(87) PCT Pub. No.: WO2015/090716
PCT Pub. Date: Jun. 25, 2015

(65) Prior Publication Data
US 2016/0320102 A1    Nov. 3, 2016

(30) Foreign Application Priority Data

Dec. 17, 2013    (DE) .................. 10 2013 226 158

(51) Int. Cl.
*F25B 17/08*    (2006.01)
*F25B 41/04*    (2006.01)
*F25B 27/02*    (2006.01)

(52) U.S. Cl.
CPC ............ *F25B 17/086* (2013.01); *F25B 17/08* (2013.01); *F25B 17/083* (2013.01); *F25B 27/02* (2013.01);

(Continued)

(58) Field of Classification Search
CPC ........ G05D 23/12; G05D 23/123; F16K 7/04; F16K 7/10
See application file for complete search history.

(56) References Cited

U.S. PATENT DOCUMENTS 3,938,741 A  *  2/1976  Allison ................... B05B 12/10
                                                          137/468
4,070,001 A  *  1/1978  Musgrove ............... F16K 51/02
                                                          137/907

(Continued)

FOREIGN PATENT DOCUMENTS

CN    2185356 Y    12/1994
CN    1127862 A    7/1996

(Continued)

OTHER PUBLICATIONS

International Search Report corresponding to PCT Application No. PCT/EP2014/073839, dated Mar. 4, 2015 (German and English language document) (5 pages).

*Primary Examiner* — Nelson J Nieves
(74) *Attorney, Agent, or Firm* — Maginot, Moore & Beck LLP

(57) ABSTRACT

An adsorption refrigeration device includes a first chamber with an adsorber/desorber material and a second chamber with an evaporator/condenser device. The first and second chambers are in fluid connection via a pipeline. The fluid connection between the chambers is blocked in a first functional position and opened in a second functional position via a valve device that is arranged in the pipeline. The valve device has a valve element with a variable diameter. The valve element has two functional positions. In the first functional position, the valve element has a first diameter by which it fills an internal cross section of the pipeline with tight contact with an inner wall of the pipeline. In the second functional position, the valve element has a second diameter (Continued)

that is smaller than the first diameter such that a gap is opened between the inner wall of the pipeline and the valve element.

13 Claims, 1 Drawing Sheet

(52) U.S. Cl.
CPC ............. *F25B 41/04* (2013.01); *Y02A 30/274* (2018.01); *Y02A 30/278* (2018.01); *Y02B 30/64* (2013.01)

(56) References Cited

U.S. PATENT DOCUMENTS

| | | | | |
|---|---|---|---|---|
| 4,109,829 A * | 8/1978 | Kuckens | ................. | G01F 13/00 222/81 |
| 4,742,956 A * | 5/1988 | Zelczer | ............. | G05D 23/1934 236/46 R |
| 4,787,408 A * | 11/1988 | Twerdochlib | ............. | F16K 7/10 137/14 |
| 4,938,259 A * | 7/1990 | Schmidt | .................. | F16K 17/34 137/517 |
| 5,038,579 A * | 8/1991 | Drucker | .................. | F25B 41/06 137/493.9 |
| 5,090,659 A * | 2/1992 | Bronnert | .................... | F16K 7/17 251/61.1 |
| 5,177,973 A * | 1/1993 | Cholkeri | ................. | F25B 41/04 236/93 A |
| 5,771,937 A * | 6/1998 | Collins | ..................... | F16K 7/10 138/89 |
| 5,950,631 A * | 9/1999 | Donaldson | ............... | A61F 11/00 128/898 |
| 6,053,210 A * | 4/2000 | Chapman | .................. | F16K 7/10 138/46 |
| 6,089,532 A * | 7/2000 | Rohloff | ............... | F16K 31/1268 251/61.2 |
| 7,887,305 B2 * | 2/2011 | Yajima | ................ | F04B 43/0081 138/30 |
| 8,517,333 B2 * | 8/2013 | Briley | ................. | F16K 31/1262 137/554 |
| 8,544,894 B1 * | 10/2013 | Borba | ..................... | F16L 17/10 141/287 |
| 8,641,943 B1 * | 2/2014 | Kipe | ....................... | B29C 45/77 264/328.8 |
| 2002/0005045 A1 | 1/2002 | Patzner | | |
| 2005/0072578 A1 * | 4/2005 | Steele | ..................... | E21B 34/08 166/386 |
| 2007/0093749 A1 * | 4/2007 | Spranger | ............... | A61M 1/367 604/99.01 |
| 2008/0224076 A1 * | 9/2008 | Jennings | ................. | E21B 34/06 251/122 |
| 2008/0289739 A1 * | 11/2008 | Bol | ....................... | B60C 23/004 152/425 |
| 2009/0027469 A1 * | 1/2009 | Furukawa | ............ | B41J 2/17563 347/93 |
| 2009/0217982 A1 * | 9/2009 | DiPerna | .................. | F16K 7/075 137/8 |
| 2009/0266363 A1 * | 10/2009 | Clemensen | ........... | A61M 16/08 128/207.16 |
| 2011/0056234 A1 * | 3/2011 | Bolin | ..................... | F25B 30/06 62/476 |
| 2011/0094596 A1 * | 4/2011 | Sugiyama | ............ | G05D 7/0664 137/14 |
| 2012/0063814 A1 * | 3/2012 | Otome | ............... | G03G 15/0822 399/258 |
| 2013/0180477 A1 * | 7/2013 | Nakajima | ............... | F01P 7/167 123/41.05 |
| 2013/0240073 A1 * | 9/2013 | Xia | ....................... | G05D 7/0113 137/843 |
| 2013/0276475 A1 * | 10/2013 | Aso | ....................... | F25B 17/083 62/477 |
| 2014/0366976 A1 * | 12/2014 | Al Shammary | .......... | F16K 7/10 138/93 |
| 2015/0053307 A1 * | 2/2015 | Tuohey | .................. | C12M 23/26 141/46 |
| 2016/0265680 A1 * | 9/2016 | Yamamoto | ............ | F16K 31/126 |
| 2016/0290696 A1 * | 10/2016 | Barot | .................. | B60H 1/3201 |
| 2016/0298777 A1 * | 10/2016 | Huseyin | ............. | F02M 37/0029 |

FOREIGN PATENT DOCUMENTS

| | | |
|---|---|---|
| CN | 1138375 A | 12/1996 |
| CN | 201050614 Y | 4/2008 |
| CN | 102797869 A | 11/2012 |
| EP | 1 154 208 A1 | 11/2001 |
| EP | 1 162 415 A1 | 12/2001 |
| EP | 2 447 624 A2 | 5/2012 |
| GB | 2 213 244 A | 8/1989 |

\* cited by examiner

ADSORPTION REFRIGERATION DEVICE, ARRANGEMENT AND MOTOR VEHICLE

This application is a 35 U.S.C. § 371 National Stage Application of PCT/EP2014/073839, filed on Nov. 5, 2014, which claims the benefit of priority to Serial No. DE 10 2013 226 158.6, filed on Dec. 17, 2013 in Germany, the disclosures of which are incorporated herein by reference in their entirety.

BACKGROUND

The disclosure concerns an adsorption refrigeration device, an arrangement having a motor and an adsorption refrigeration device, and a motor vehicle.

Adsorption refrigeration devices of the type discussed here are well known. Such an adsorption refrigeration device has at least one first chamber which comprises an adsorber/desorber material. At least one second chamber is provided which comprises an evaporator/condenser device. The first and second chambers are fluidically connected together via a pipeline, wherein a valve device is arranged in the pipeline. By means of this, the fluidic connection between the first and second chamber can be blocked in a first function position and opened in a second function position. Typically, large cross sections, in particular in the region of around 50 mm, are required for the pipeline. These are not easy to close with the valves conventionally used in the automotive sector. Rather—in particular because of a vacuum typically predominating in the two chambers—a technically complex and costly shut-off valve is required, use of which is problematic in a motor vehicle also for cost reasons.

SUMMARY

The disclosure is therefore based on the object of creating an adsorption refrigeration device, an arrangement and a motor vehicle, without said disadvantages.

This object is achieved in that an adsorption refrigeration device is created with the features of the disclosure. The adsorption refrigeration device is distinguished in that the valve device has a valve element with variable diameter, wherein the valve element is configured such that in the first function position it has a first diameter with which it fills an inner cross section of the pipeline and lies tightly against an inner wall thereof, wherein in the second function position it has a second diameter which is smaller than the first diameter so that a gap is opened between the inner wall of the pipeline and the valve element. In the manner described herein, the valve element and the entire valve device can be constructed technically and structurally very simply, in particular with very few components and at low cost. It is also possible to seal even large pipe cross sections securely and reproducibly with the valve device, in particular with the valve element. This straightforward and economic technology of the valve device finally makes the use of an adsorption refrigeration device for air conditioning in motor vehicles economically feasible.

The working method of an adsorption refrigeration device is known in principle, so this will only be discussed briefly here. An adsorption refrigeration device is a sorption refrigeration device which works with a solid sorbent. The first chamber comprising the adsorber/desorber material acts as an adsorber/desorber device. In an adsorption phase of the adsorption refrigeration device, a fluid refrigerant present in the evaporator/condenser device evaporates, is transferred via the pipeline from the second chamber to the first chamber, and is there adsorbed by the adsorber/desorber material. For this, the adsorber/desorber material has a very large surface area. In the adsorption phase, the evaporator/condenser device works as an evaporator, wherein it extracts evaporation heat from the environment or in particular from a first cooling circuit, for example of a motor vehicle, wherein the evaporator/condenser device makes refrigeration capacity available to the environment or the coolant. At the same time, the adsorber/desorber material works as an adsorber, wherein absorption heat is released in its vicinity and preferably dissipated via a second cooling circuit.

In a desorption phase of the adsorption refrigeration device, heat is supplied to the adsorber/desorber material, which then acts as a desorber, for example via the second cooling circuit described above which then acts as a heating circuit. In this way, the refrigerant is expelled from the adsorber/desorber material and evaporated. Via the pipeline, it is supplied to the second chamber and hence to the evaporator/condenser device which now acts as a condenser, wherein the refrigerant is liquefied in the evaporator/condenser device. Preferably, the condensation heat released here is dissipated, for example via the first cooling circuit described above.

By means of the valve device arranged in the pipeline, it is possible to store refrigeration capacity with little loss. For this, after completion of the desorption phase, the valve device is moved into its first function position so that the pipeline is closed and the fluidic connection between the first and second chamber is blocked. The adsorption phase cannot then be started, rather the refrigerant remains in the second chamber, wherein at the same time the adsorber/desorber material is not loaded with refrigerant. In this state, the adsorption refrigeration device neither extracts heat from the environment nor dissipates heat to the environment. Nor does it provide any refrigeration capacity. If refrigeration capacity is required, the valve device is moved into its second function position so that the fluidic connection between the first and second chamber is opened. The adsorption phase then begins, wherein refrigeration capacity is made available in the evaporator/condenser device. It is thus possible to carry out the desorption phase at a first time and store virtual refrigeration capacity in the adsorption refrigeration device, wherein this can then be retrieved at an arbitrary later second time by opening the valve device and hence initiating the adsorption phase.

The refrigerant for the adsorption refrigeration device is preferably water or methanol. The adsorber/desorber material is preferably a material selected from a group consisting of active charcoal, aluminum oxide, aluminum phosphate, silica aluminum phosphate, metal silica aluminum phosphate, mesostructure silicate, a metal organic framework, a microporous material, in particular a microporous polymer, a silica gel and a zeolite. These materials, because of their large inner surface area, have the property of absorbing the refrigerant, in particular water or methanol, very well.

The evaporator/condenser device preferably has a heat transmission structure. In the exemplary embodiment, it is possible that a rib structure and/or a pipeline, configured as a heat transmission structure, for the first cooling circuit is provided in the second chamber.

By means of the heat transmission structure, it is firstly possible to supply evaporation heat to the evaporator/condenser device when this is working as an evaporator in the adsorption phase, wherein secondly heat can be extracted from this to dissipate the condensation heat when the evaporator/condenser device is working as a condenser in the desorption phase.

Preferably, the first chamber also has a heat transmission structure, particularly preferably in the manner of a pipeline arranged in the form of a heat transmission structure, for the second cooling circuit, wherein the heat transmission structure, in particular the pipeline, is coated with the adsorber/desorber material on the outside. In this way, it is possible to supply heat to the adsorber/desorber material in a desorption phase in order to expel the refrigerant from the adsorber/desorber material, wherein in the adsorption phase it is possible to extract the adsorption heat released in the region of the adsorber/desorber material.

The pipeline between the first and second chambers preferably has a diameter of around 50 mm, preferably 50 mm. The diameter is preferably the inner diameter of the pipeline.

In a preferred exemplary embodiment, the valve element has a variable volume, wherein not only the size in one direction (namely the diameter) is variable, but also the volume of the valve element as a whole.

The term "diameter" should not be understood restrictively in relation to a circular cross section of the valve element, but rather designates a length dimension in a cross section plane of the pipeline and valve element, which is variable independently of the concrete form firstly of the valve element and secondly of the pipeline, so that the valve element fills the cross section of the pipeline in a first function position, while it opens it in a second function position.

Particularly preferably, the valve element is adapted in its geometry to a geometry of the pipeline. In this way, in the first function position, a particularly tight contact of the valve element against the inner wall of the pipeline is guaranteed. Particularly preferably, the cross section of the valve element is adapted geometrically to a cross section of the pipeline.

An adsorption refrigeration device is preferred which is distinguished in that the valve element has an elastic sleeve. This surrounds a working chamber which is sealed against the pipeline and the first and second chambers. The working chamber is actively connected to a control valve device. Preferably, it is in fluidic connection with the control valve device. Due to the active connection, in the first function position, the working chamber can be pressurized via the control valve device with the first pressure, wherein in the second function position it can be pressurized with a second pressure. The first pressure is higher than the second pressure.

Due to the elastic sleeve, the working chamber this surrounds is formed variable in volume, depending on the pressure in the working chamber firstly and outside the elastic sleeve secondly. Because it is sealed against the pipeline and the first and second chambers, it is either enlarged in volume against the pressure predominating there or reduced in volume by this pressure or by the elasticity of the sleeve. Preferably, the first pressure is higher than the pressure predominating in the pipeline or the first and second chambers, which is also called the system pressure, so that in the first function position of the valve device the volume of the working chamber is enlarged, in particular it has a greater volume than in the second function position. The second pressure is preferably lower than or equal to the system pressure predominating in the pipeline, the first and the second chambers, so that in this function position the volume of the working chamber is reduced, in particular it has a smaller volume than in the first function position. In the first function position, the elastic sleeve is pressed by the pressure predominating in the working chamber tightly against the inner wall of the pipeline, wherein in the second function position it has a distance from the inner wall of the pipeline so that a gap is opened between the inner wall of the pipeline and the elastic sleeve.

The elastic sleeve preferably comprises a material selected from a group consisting of natural rubber, an elastic polymer, and synthetic rubber. Preferably, the elastic sleeve consists of one of said materials.

The first pressure is preferably a pressure predominating in the environment of the adsorption refrigeration device, in particular atmospheric pressure or ambient pressure. This is the case in particular if the adsorption refrigeration device works as a whole under vacuum, which is regularly the case if water is used as a refrigerant. In this case, system pressures in the range of around 10 mbar to around 100 mbar predominate in the first and second chamber and in the pipeline.

The advantage of pressurizing the working chamber with atmospheric pressure in the first function position of the valve device is that no external pressure source is required which would have to remain in an operating mode in order to keep the valve device in its first function position. Rather, with no further intervention, the valve device remains in the first function position as long as the pressure in the working chamber remains above the ambient pressure. The fluidic connection between the first chamber and the second chamber may remain blocked for almost any length of time, without any energy supply being required for the adsorption refrigeration device. Thus, in particular when the adsorption refrigeration device is used in a motor vehicle, the refrigeration capacity can also be stored for a long time after it has been switched off, in order then to make this available without loss in good time before start up or on start-up of the motor vehicle. Storage of the refrigeration capacity in this way does not load either an accumulator or the motor vehicle or a vehicle battery or any other energy source.

The second pressure is preferably lower than or equal to the system pressure of the adsorption refrigeration device. If the second pressure is equal to the system pressure, the elastic sleeve contracts because of its elastic properties and thus moves away from the inner wall. If the second pressure is lower than the system pressure, the elastic sleeve is compressed further by the pressure difference between the system pressure and the second pressure.

The valve device preferably comprises firstly the valve element and secondly the control valve device, wherein the valve element can be actuated by the control valve device so that the valve device as a whole can be moved from its first function position into its second function position and vice versa.

The valve device comprising the elastic sleeve is constructed particularly simply and economically, wherein at the same time it is extremely reliable in function and works reproducibly. This is due in particular to the fact that only few, simple and low-cost elements are used for the valve device.

An exemplary embodiment of the adsorption refrigeration device is preferred which is distinguished in that in the first function position, the working chamber is fluidically connected via the control valve device to the environment of the adsorption refrigeration device. In this case, the working chamber is directly pressurized with an ambient pressure in the environment of the adsorption refrigeration device, preferably atmospheric pressure, via the control device. If then the first chamber, the second chamber and the pipeline are under vacuum, the working chamber is then expanded, wherein the elastic sleeve lies tightly against the inner wall of the pipeline. In this way, an extremely simple shift of the valve device into its first function position can be achieved without any external pressure source being required. In particular, no pressure pump is required to expand the elastic sleeve. Rather the vacuum present in any case in the adsorption refrigeration device, in collaboration with the ambient pressure, serves as a drive for the expansion of the working chamber, the elastic sleeve and hence for the shift of the valve device into the first function position.

An exemplary embodiment of the adsorption refrigeration device is also preferred which is distinguished in that in the second function position, the working chamber is fluidically connected via the control valve device to a vacuum source. The vacuum source is preferably configured such that it produces the second pressure in the working chamber which is preferably lower than or equal to a system pressure of the adsorption refrigeration device. Thus, in a very simple and yet economic fashion, it is possible to arrange the valve device in its second function position. This is quite particularly the case if a vacuum source is used which is present in any case in the environment of the adsorption refrigeration device. For example, on use of an adsorption refrigeration device in a motor vehicle, this may be a vacuum source provided in any case for a brake servo. Furthermore, motor vehicles but also other application environments of adsorption refrigeration devices regularly have a vacuum pump to which the control valve device can be connected. Thus regularly no separate vacuum source is required to pressurize the working chamber with the second pressure. Evidently however, an exemplary embodiment of the adsorption refrigeration device is possible in which this has its own assigned vacuum source, in particular a vacuum pump.

As a whole, in the manner described here, a simple and economic valve device is implemented which finally can be controlled via pressure conditions which exist in any case. The valve device only comprises the very simply structured valve element with the elastic sleeve, a fluidic connection to the control valve device, and the control valve device itself. It is possible that the valve device also comprises the vacuum source, preferably however the control valve device is fluidically connected to an external vacuum source which is provided in any case, so that the valve device only has a very small number of parts which, individually and also in combination, are formed extremely simply and economically, wherein only the pressure conditions already present are used to move the valve device from its first to its second function position and vice versa.

An exemplary embodiment of the adsorption refrigeration device is also preferred which is distinguished in that the pipe element has a constriction on which the valve element lies tightly in a first function position. This constriction is preferably formed as a cross section reduction or in particular as an annular, peripheral protrusion extending radially inwardly into the pipeline, against which the valve element can lie snugly in the first function position. In this way, in the region of the cross section reduction, a particularly good contact of the valve element on the inner wall of the pipe element is achieved, resulting in an increased tightness.

An exemplary embodiment of the adsorption refrigeration device is preferred which is distinguished in that the valve element is configured as a rubber gaiter and/or a bellows. These are particularly simple and economic embodiments of the valve element, which also with simple means guarantee a very high tightness of the valve device in a first function position. It has been found that a rubber gaiter or bellows can easily be adapted in its geometry to the geometry of the pipeline, giving a high sealing effect.

Finally, an exemplary embodiment of the adsorption refrigeration device is preferred which is distinguished in that this has at least two chambers with adsorber/desorber material and at least two chambers each comprising an evaporator/condenser device. From the description of the adsorption refrigeration device above, it is clear that this works in phases, wherein an adsorption phase and a desorption phase alternate preferably cyclically. Therefore no continuous provision of refrigeration capacity is possible. If however the adsorption refrigeration device has a plurality of chambers with adsorber/desorber material and a plurality of chambers with evaporator/condenser devices, a quasi-continuous provision of refrigeration capacity can be achieved in which the various chambers alternate in their functionality. Thus one chamber with adsorber/desorber material works as an adsorber, and simultaneously a second chamber with adsorber/desorber material works as a desorber. Similarly, one chamber with an evaporator/condenser device may work as an evaporator, while at the same time another chamber with an evaporator/condenser device works as a condenser. At the end of a cycle or phase, the functionality of the chambers can be reversed, wherein at least one chamber with an evaporator/condenser device is always available in which refrigeration capacity is available.

Preferably, the adsorption refrigeration device comprises precisely two chambers with adsorber/desorber material. Additionally or alternatively, the adsorption refrigeration device preferably comprises precisely two chambers each with an evaporator/condenser device.

An exemplary embodiment of the adsorption refrigeration device is also preferred in which this has an integral multiple of two first chambers with adsorber/desorber material and/or an integral multiple of two second chambers each with an evaporator/condenser device.

An exemplary embodiment of the adsorption refrigeration device is particularly preferred which has precisely two first chambers with adsorber/desorber material and also precisely two second chambers each with an evaporator/condenser device.

The object is also achieved in that an arrangement with the features of the disclosure is created. This has a motor, in particular an internal combustion engine emitting exhaust gas or an electric motor or an electrical machine, and an adsorption refrigeration device according to any of the exemplary embodiments described above. The motor and the adsorption refrigeration device are fluidically connected together such that the adsorption refrigeration device may be supplied with the waste heat from the motor, in one exemplary embodiment exhaust gas from the internal combustion engine, as a heat source. Alternatively or additionally, it is proposed that the adsorption refrigeration device may be supplied with coolant from a coolant circuit of the engine, via the fluidic connection or an additional fluidic connection, as a heat source. Thus it is possible to use the heat available in the exhaust gas of the internal combustion engine or the cooling circuit provided for cooling the engine, in order to desorb the refrigerant from the adsorber/desorber material in the desorption phase of the adsorption refrigeration device. In contrast to a compression refrigeration device, no mechanical drive energy need be taken from the motor in order to operate the refrigeration device. Rather, waste heat already present from the exhaust gas and/or the cooling circuit is used to operate the adsorption refrigeration device. This has the advantage that the motor can work more efficiently with lower fuel consumption, a greater range and/or longer operating period until the next charge of the accumulator, than is the case if it must provide additional drive power for the compressor of a compression refrigeration device.

The object is finally also achieved in that a motor vehicle with the features of the disclosure is created. The motor vehicle is distinguished by an arrangement according to the exemplary embodiments described above. In particular, the motor vehicle accordingly has an adsorption refrigeration device which can be operated with the waste heat from a motor of the motor vehicle. In connection with the air conditioning of the motor vehicle, no additional fuel consumption occurs, or in the case of an electric vehicle in which the waste heat from the cooling circuit of an electric motor is used, there is no reduction in range because the air conditioning is not provided at the cost of the power available in an accumulator of the electric vehicle. In addition, the possibility of storing refrigeration capacity because of the functionality of the valve device has the advantage that the adsorption refrigeration device can be operated without using the motor, insofar as refrigeration capacity has previously been stored in the adsorption refrigeration device. This very simply allows air conditioning of a motor vehicle interior while at a standstill, whereby the comfort of the motor vehicle is substantially increased.

The motor vehicle is preferably configured as a car. It may also however be a goods vehicle, wherein an adsorption refrigeration device may be used not only for air conditioning of a driver's cab but rather also for air conditioning of a loading space of the goods vehicle.

BRIEF DESCRIPTION OF THE DRAWINGS

The disclosure is described below in more detail with reference to the drawings. This shows.

DETAILED DESCRIPTION

Figure 1:
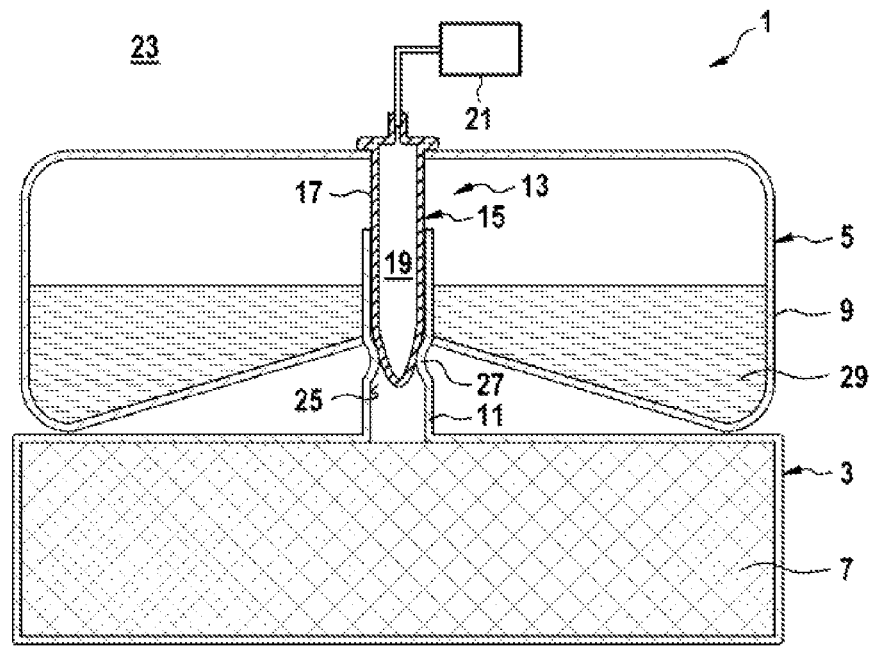
FIG. 1 a diagrammatic depiction of an exemplary embodiment of an adsorption refrigeration device with a valve device in a first function position, and FIG. 2 the exemplary embodiment according to FIG. 1 with the valve device in the second function position.

FIG. 1 shows a diagrammatic depiction of an exemplary embodiment of an adsorption refrigeration device 1 which has a first chamber 3 and a second chamber 5. An adsorber/desorber material 7 is arranged in the first chamber 3. The second chamber 5 has an evaporator/condenser device 9 which preferably comprises a heat transmission structure. Particularly preferably, an evaporator/condenser device 9 is arranged in the second chamber 5, or the second chamber 5 is configured as an evaporator/condenser device 9.

The first chamber 3 is fluidically connected to the second chamber 5 via a pipeline 11. A valve device 13 is arranged in the pipeline 11. This has a valve element 15 with variable diameter.

In the exemplary embodiment shown, the valve element 15 has an elastic sleeve 17 surrounding a working chamber 19. The working chamber 19 is sealed against the pipeline and also against the first chamber 3 and the second chamber 5. Preferably, the valve element 15 is formed as a rubber bellows.

The working chamber 19 is actively connected to the control valve device 21, in particular fluidically connected, so that it can be pressurized by the control device 21 with either the first pressure or the second pressure.

Because of the elastic properties of the elastic sleeve 17, the valve element 15 is effectively designed inflatable, wherein it has a variable volume and hence at the same time a variable diameter.

The valve device 13 is shown in FIG. 1 in its first function position in which the working chamber 19 is fluidically connected via the control valve device 21 to an environment 23 of the adsorption refrigeration device 1. Therefore ambient pressure predominates in the working chamber 19 and also in the environment 23, preferably atmospheric pressure. In the first chamber 3, the second chamber 5 and the pipeline 11 however, a vacuum predominates called the system pressure, which in all cases is lower than the ambient pressure in the environment 23. Therefore in this first function position, the valve element 15 is also inflated wherein it has a first diameter with which it fills an inner cross section of the pipeline 11, lying tightly against the inner wall 25 of the pipeline 11.

In the exemplary embodiment shown, the pipeline 11 has a constriction 27, here formed as an annular peripheral protrusion pointing radially inward, of the inner wall 25. In particular, in the first function position the valve element 15 lies tightly against this constriction 27 on the inside. It has been found that in the exemplary embodiment shown here—above the constriction 27 in FIG. 1—the valve element 15 lies tightly against the inner wall 25 over a large area. Thus a very reliable, tight and reproducible contact of the valve element 15 against the inner wall 25 of the pipeline 11 is achieved in the first function position.

FIG. 1 also shows that a refrigerant 29, preferably water or methanol, is arranged in the second chamber 5.

Figure 2:
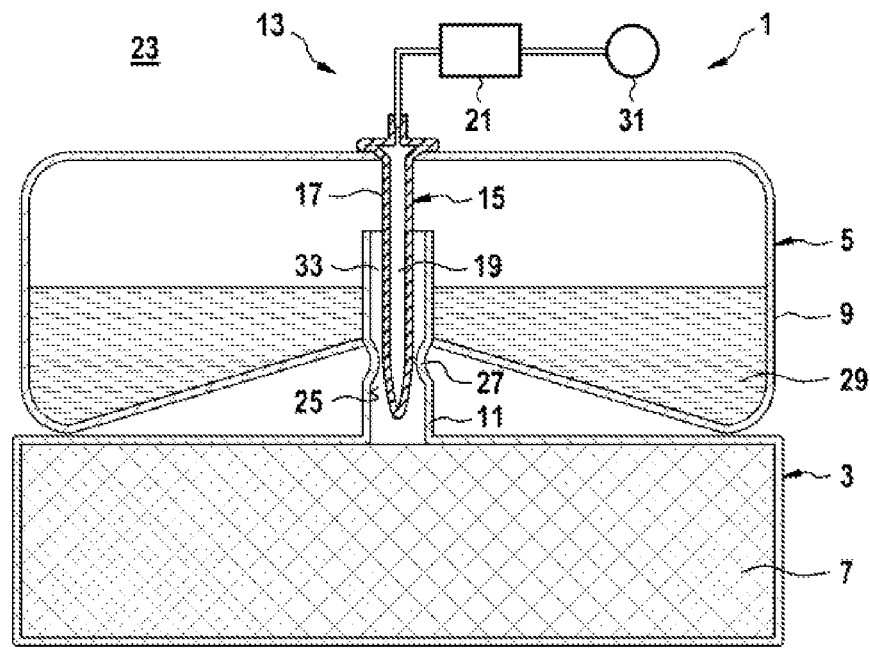

FIG. 2 shows the exemplary embodiment of the adsorption refrigeration device according to FIG. 1 in a second function position. The same and equivalent elements carry the same reference numerals, so that to this extent reference is made to the description above. In this second function position of the valve device 13, the working chamber 19 is fluidically connected via the control valve device 21 to a vacuum source 31, indicated merely diagrammatically. This may for example be the brake servo of a motor vehicle or another vacuum pump provided elsewhere in the motor vehicle, or also a separate vacuum source assigned to the adsorption refrigeration device 1, in particular a vacuum pump. In this state, a second pressure predominates in the working chamber 19 which in all cases is lower than the pressure in the first function position, and in particular lower than or equal to system pressure predominating in the first chamber 3, the second chamber 5 and the pipeline 11.

Because of the pressure conditions predominating or because of the elastic properties of the elastic sleeve 17, the valve element 15 now, in the second function position, is no longer inflated but rather relaxed or even contracted, so that it has a smaller volume than in the first function position and a second diameter which is smaller than the first diameter, wherein the second diameter is also configured such that a gap 33 is opened between the inner wall 25 and the valve element 15, in particular its elastic sleeve 17. The valve element 15 thus no longer lies tightly against the inner wall 25.

In this way, in the second function position a fluidic path is opened between the first chamber 3 and the second chamber 5 along the pipeline 11, which path is blocked by the valve element 15 in the first function position.

The function of the adsorption refrigeration device 1 is described below with reference to FIGS. 1 and 2:

In a desorption phase, heat is supplied to the adsorber/desorber material 7 loaded with refrigerant 29 in the first chamber 3, so that the refrigerant 29 is desorbed from the adsorber/desorber material and hence expelled.

Preferably, an arrangement is provided of an adsorption refrigeration device 1 and a motor (not shown), wherein particularly preferably the arrangement is part of a motor vehicle, in particular a car. The adsorption refrigeration device 1 is fluidically connected to the motor such that the adsorption refrigeration device 1 can be supplied with waste heat from the motor, in particular exhaust gas from the internal combustion engine and/or coolant from a coolant circuit of the motor, as a heat source. The waste heat from the motor, which is contained either in the exhaust gas or in the coolant used to cool the motor, is then used to desorb the refrigerant 29 from the adsorber/desorber material 7.

The desorbed refrigerant then passes via the pipeline 11 to the second chamber 5 where it condenses. It is clear that during the desorption phase, the valve device 13 is arranged in its second function position shown in FIG. 2, so that the fluidic path between the first chamber 3 and the second chamber 5 via the pipeline 11 is open.

When the desorption phase is complete and the refrigerant has been expelled completely, or as completely as either desired or possible, from the adsorber/desorber material 7, it is possible to arrange the valve device 13 in its first function position shown in FIG. 1. In this case, the fluidic connection between the first chamber 3 and the second chamber 5 via the pipeline 11 is closed so that no refrigerant 29 can flow between the first chamber 3 and the second chamber 5. It is thus possible to store refrigeration capacity in the adsorption refrigeration device 1. Since, in the first function position in FIG. 1, the working chamber 19 is pressurized only with ambient pressure from the environment 23, in particular atmospheric pressure, this storage state can be maintained virtually as long as desired without the need for a supply of power, for example to drive a pump. In particular, the refrigeration capacity in a motor vehicle can be stored in this way without operating a motor, i.e. the internal combustion engine or an electric motor of the motor vehicle.

When the refrigeration capacity is required, the valve device 13 is brought to its second function position shown in FIG. 2 and the fluidic path between the first chamber 3 and the second chamber 5 via the pipeline 11 is opened.

In this case, because of the very large surface area of the adsorber/desorber material 7, a driving force is present for the adsorption of the refrigerant 29 on this surface. The adsorber/desorber material thus effectively draws in the refrigerant 29 which evaporates in the second chamber 5 and flows via the pipeline 11 into the first chamber 3, where it is adsorbed on the surface of the adsorber/desorber material. The refrigerant 29 absorbs evaporation heat in the second chamber 5, so that refrigeration capacity is made available here which can be used for air conditioning, for example of an interior of a motor vehicle. The adsorption heat released in the first chamber 3 is preferably dissipated.

As a whole, it has been found that because of the embodiment of the valve device 13 proposed here, it is possible to provide a simply structured and efficient adsorption refrigeration device 1 which can be produced economically and is able to store refrigeration capacity securely even for a long time. This is particularly advantageous for the arrangement of the adsorption refrigeration device 1 with a motor, and for a motor vehicle equipped with the adsorption refrigeration device 1.

The invention claimed is:

1. An adsorption refrigeration device, comprising:
    at least one first chamber with an adsorber/desorber material; and
    at least one second chamber with an evaporator/condenser device, the first chamber and the second chamber fluidically connected together via a pipeline,
    wherein the fluidic connection between the first chamber and the second chamber is configured to be blocked in a first function position and opened in a second function position via a valve device arranged in the pipeline, and
    wherein the valve device has a valve element with a variable diameter, the valve element configured such that (i) in the first function position, the valve element has a first diameter with which the valve element fills an inner cross section of the pipeline and lies tightly against an inner wall portion of the pipeline and (ii) in the second function position, the valve element has a second diameter that is smaller than the first diameter so that a gap is opened between the inner wall portion of the pipeline and the valve element.

2. The adsorption refrigeration device as claimed in claim 1, wherein:
    the valve element has an elastic sleeve surrounding a working chamber,
    the working chamber is sealed against the pipeline, the first chamber, and the second chamber,
    the working chamber is actively connected to a control valve device so that (i) in the first function position, the working chamber is configured to be pressurized through the control valve device with a first pressure and (ii) in the second function position, the working chamber is configured to be pressurized through the control valve device with a second pressure, and
    the first pressure is higher than the second pressure.

3. The adsorption refrigeration device as claimed in claim 2, wherein in the first function position, the working chamber is vented via the control valve device to an environment of the adsorption refrigeration device.

4. The adsorption refrigeration device as claimed in claim 2, wherein in the second function position, the working chamber is fluidically connected via the control valve device to a vacuum source.

5. The adsorption refrigeration device as claimed in claim 1, wherein the inner wall portion against which the valve element lies tightly in the first function position is a constriction of an inner wall of the pipeline.

6. The adsorption refrigeration device as claimed in claim 1, wherein the valve element is configured as one or more of a rubber gaiter and a bellows.

7. The adsorption refrigeration device as claimed in claim 1, wherein:
    the valve element has an elastic sleeve surrounding a working chamber; and
    the elastic sleeve extends from the pipeline to a location outwardly of the pipeline.

8. The adsorption refrigeration device as claimed in claim 7, wherein the elastic sleeve extends from the pipeline to a location outwardly of the at least one first chamber and the at least one second chamber.

9. The adsorption refrigeration device as claimed in claim 1, wherein:
    the pipeline includes a first portion with a first diameter, a second portion with a second diameter, and a third portion with a third diameter;
    the second diameter is smaller than the first diameter and smaller than the third diameter;
    the second portion is located between the first portion and the third portion;

the valve element has an elastic sleeve surrounding a working chamber; and the elastic sleeve in the second function position extends at least from the first portion through the second portion to the third portion.

10. The adsorption refrigeration device as claimed in claim 9, wherein:

the elastic sleeve extends from the pipeline to a location outwardly of the pipeline.

11. The adsorption refrigeration device as claimed in claim 10, wherein the elastic sleeve extends through the at least one first chamber or the at least one second chamber to a location outside of the at least one first chamber and the at least one second chamber.

12. An arrangement, comprising:

a motor; and an adsorption refrigeration device including:

at least one first chamber with an adsorber/desorber material, and at least one second chamber with an evaporator/condenser device, the first chamber and the second chamber fluidically connected together via a pipeline, wherein the fluidic connection between the first chamber and the second chamber is configured to be blocked in a first function position and opened in a second function position via a valve device arranged in the pipeline, and wherein the valve device has a valve element with a variable diameter, the valve element configured such that (i) in the first function position, the valve element has a first diameter with which the valve element fills an inner cross section of the pipeline and lies tightly against an inner wall of the pipeline and (ii) in the second function position, the valve element has a second diameter that is smaller than the first diameter so that a gap is opened between the inner wall of the pipeline and the valve element, wherein the motor and the adsorption refrigeration device are fluidically connected to each other such that the adsorption refrigeration device is configured to be supplied with waste heat from the motor.

13. A motor vehicle, comprising:

an arrangement with a motor and an adsorption refrigeration device, the adsorption refrigeration device including:

at least one first chamber with an adsorber/desorber material, and at least one second chamber with an evaporator/condenser device, the first chamber and the second chamber fluidically connected together via a pipeline, wherein the fluidic connection between the first chamber and the second chamber is configured to be blocked in a first function position and opened in a second function position via a valve device arranged in the pipeline, and wherein the valve device has a valve element with a variable diameter, the valve element configured such that (i) in the first function position, the valve element has a first diameter with which the valve element fills an inner cross section of the pipeline and lies tightly against an inner wall of the pipeline and (ii) in the second function position, the valve element has a second diameter that is smaller than the first diameter so that a gap is opened between the inner wall of the pipeline and the valve element, wherein the motor and the adsorption refrigeration device are fluidically connected to each other such that the adsorption refrigeration device is configured to be supplied with waste heat from the motor.

* * * * *